(12) United States Patent
Deng et al.

(10) Patent No.: US 11,351,690 B2
(45) Date of Patent: Jun. 7, 2022

(54) CUTTER FOR CUTTING A LINEAR ELEMENT

(71) Applicants: Tyco Electronics (Shanghai) Co. Ltd., Shanghai (CN); TE Connectivity Services GmbH, Schaffhausen (CH); Measurement Specialties (Chengdu) Ltd., Chengdu (CN); Kunshan League Automechanism Co., Ltd., Kunshan (CN)

(72) Inventors: Yingcong Deng, Shanghai (CN); Dandan Zhang, Shanghai (CN); Fengchun Xie, Shanghai (CN); Lvhai Hu, Shanghai (CN); Bo Pang, Shanghai (CN); Haidong Wu, Shanghai (CN); Jianyong Fan, Shanghai (CN); Rong Zhang, Shanghai (CN); Roberto Francisco-Yi Lu, Bellevue, WA (US)

(73) Assignees: Kunshan League Automechanism Co., Ltd., Kunshan (CN); Tyco Electronics (Shanghai) Co. Ltd., Shangahi (CH); TE Connectivity Services GmbH, Schaffhausen (CH); Measurement Specialties (Chengdu) Ltd., Chengdu (CN)

( * ) Notice: Subject to any disclaimer, the term of this patent is extended or adjusted under 35 U.S.C. 154(b) by 0 days.

(21) Appl. No.: 17/096,129

(22) Filed: Nov. 12, 2020

(65) Prior Publication Data
US 2021/0146565 A1 May 20, 2021

(30) Foreign Application Priority Data
Nov. 14, 2019 (CN) .......................... 201921964996.2

(51) Int. Cl.
*B26D 1/09* (2006.01)
*B26D 1/00* (2006.01)

(52) U.S. Cl.
CPC ...... *B26D 1/095* (2013.01); *B26D 2001/0066* (2013.01)

(58) Field of Classification Search
CPC . B21F 11/00; B26D 1/095; B26D 2001/0066; H02G 1/1258
See application file for complete search history.

(56) References Cited

U.S. PATENT DOCUMENTS 3,330,037 A * 7/1967 Hoen .................... B26B 17/003
30/180
4,803,903 A * 2/1989 Wolter ................. H02G 1/1212
81/9.43

(Continued)

*Primary Examiner* — Stephen Choi
(74) *Attorney, Agent, or Firm* — Barley Snyder

(57) ABSTRACT

A cutter for cutting a linear element includes a support frame, a pair of blade holders disposed opposite to each other and movably disposed on the support frame, a pair of blades facing each other and each disposed on one of the pair of blade holders, a pair of holding blocks facing each other and each disposed on one of the pair of blade holders, and a driving device disposed on the support frame. The driving device drives the pair of blade holders to move synchronously in a direction approaching each other or a direction separating away from each other. The pair of holding blocks clamp the linear element and the pair of blades cut off the linear element clamped by the pair of holding blocks while the pair of blade holders move synchronously in the direction approaching each other.

20 Claims, 3 Drawing Sheets

(56) References Cited

U.S. PATENT DOCUMENTS

| | | | | |
|---|---|---|---|---|
| 5,331,867 A | * | 7/1994 | Carpenter | H02G 1/1256 |
| | | | | 81/9.41 |
| 5,771,573 A | * | 6/1998 | Talley | H02G 1/1265 |
| | | | | 29/825 |
| 5,797,299 A | * | 8/1998 | Long, Jr. | B21F 11/00 |
| | | | | 29/564.4 |

* cited by examiner

CUTTER FOR CUTTING A LINEAR ELEMENT

CROSS-REFERENCE TO RELATED APPLICATION

This application claims the benefit of the filing date under 35 U.S.C. § 119(a)-(d) of Chinese Patent Application No. 201921964996.2, filed on Nov. 14, 2019.

FIELD OF THE INVENTION

The present disclosure relates to a cutter and, more particularly, to a cutter for cutting a linear element.

BACKGROUND

In the field of electronics manufacturing, it is often necessary to cut elongated metal wires, such as conductor wires. In the prior art, workers usually use scissors to cut the wires directly. However, the metal wires are easily damaged during cutting because they are too fine, and the efficiency of manual cutting is very low.

SUMMARY

A cutter for cutting a linear element includes a support frame, a pair of blade holders disposed opposite to each other and movably disposed on the support frame, a pair of blades facing each other and each disposed on one of the pair of blade holders, a pair of holding blocks facing each other and each disposed on one of the pair of blade holders, and a driving device disposed on the support frame. The driving device drives the pair of blade holders to move synchronously in a direction approaching each other or a direction separating away from each other. The pair of holding blocks clamp the linear element and the pair of blades cut off the linear element clamped by the pair of holding blocks while the pair of blade holders move synchronously in the direction approaching each other.

BRIEF DESCRIPTION OF THE DRAWINGS

The invention will now be described by way of example with reference to the accompanying Figures, of which.

DETAILED DESCRIPTION OF THE EMBODIMENTS

Figure 1:
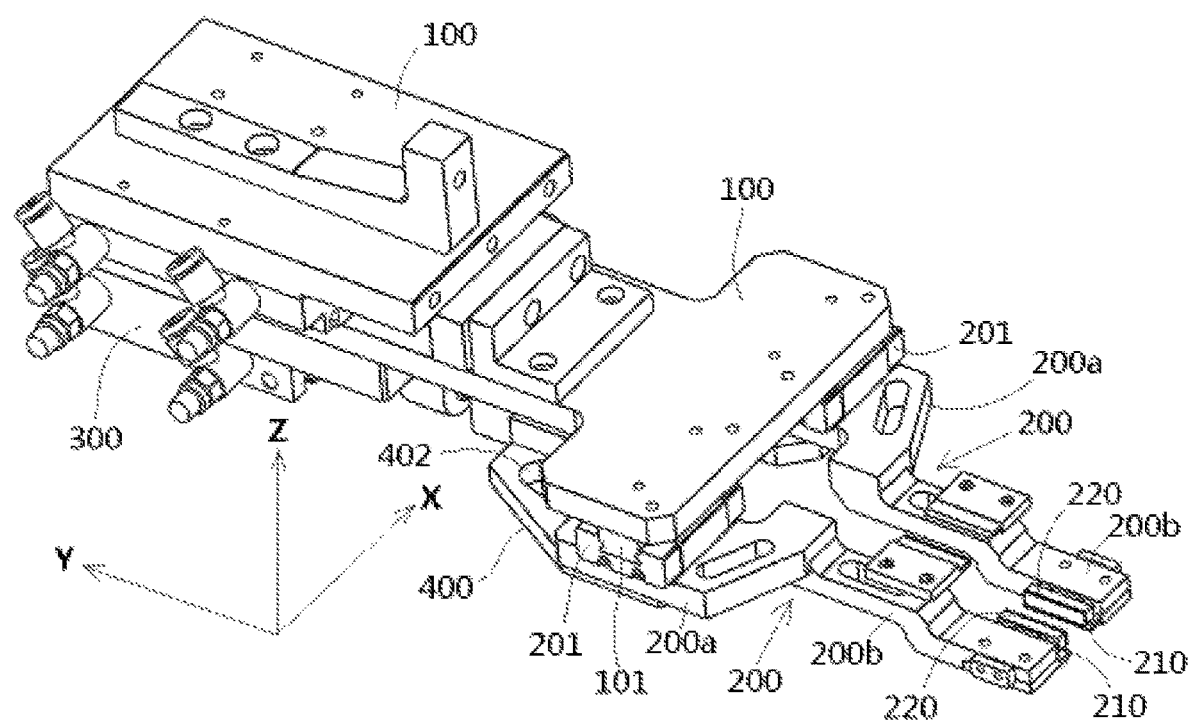
FIG. 1 is a top perspective view of a cutter according to an embodiment.

Technical solutions of the present disclosure will be described hereinafter in detail through embodiments and with reference to the attached drawings. In the specification, the same or like reference numerals refer to the same or like elements. The illustration of the embodiments of the present disclosure made with reference to the attached drawings is aimed to explain the general concept of the present disclosure, and should not to be construed as a limitation of the present disclosure.

In addition, in the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

A cutter for cutting a linear element according to an embodiment, as shown in FIG. 1, comprises a support frame 100, a pair of blade holders 200, a pair of blades 210, a pair of holding blocks 220 and a driving device (300, 400). The pair of blade holders 200 are opposite to each other and movably installed on the support frame 100. The pair of blades 210 face each other and are installed on the pair of blade holders 200 respectively. The pair of holding blocks 220 face each other and are installed on the pair of blade holders 200 respectively. The driving device (300, 400) is installed on the support frame 100 and is used to drive the pair of blade holders 200 to move synchronously in a direction of approaching each other or separating away from each other.

Figure 2:
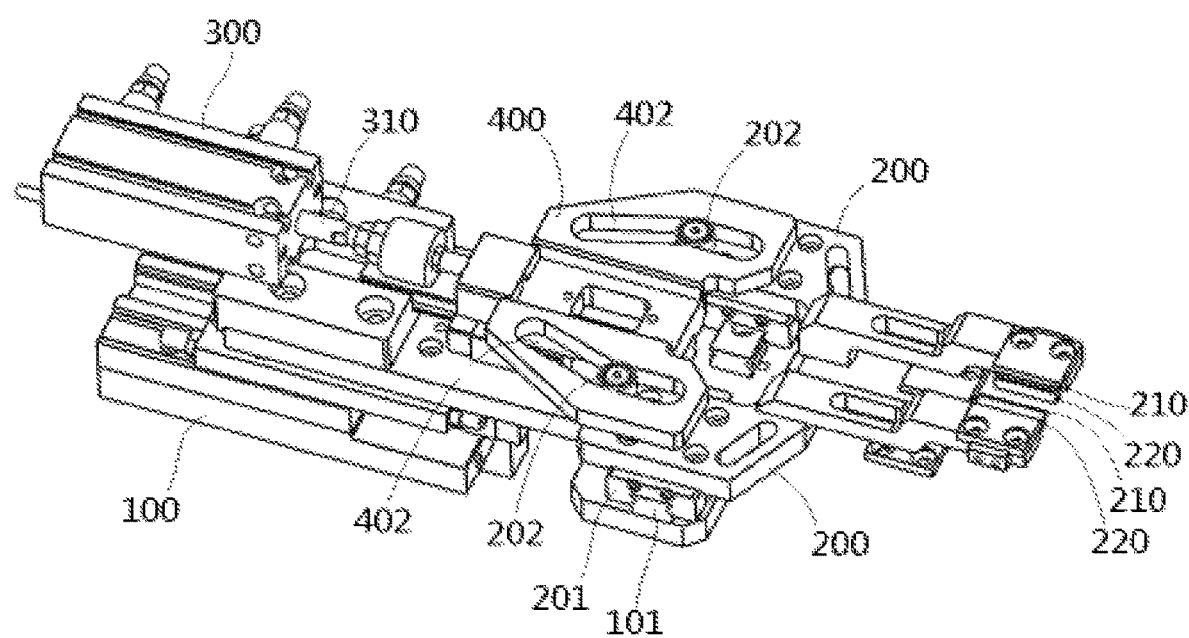
FIG. 2 is a bottom perspective view of the cutter with a pair of blades in an open position.
Figure 3:
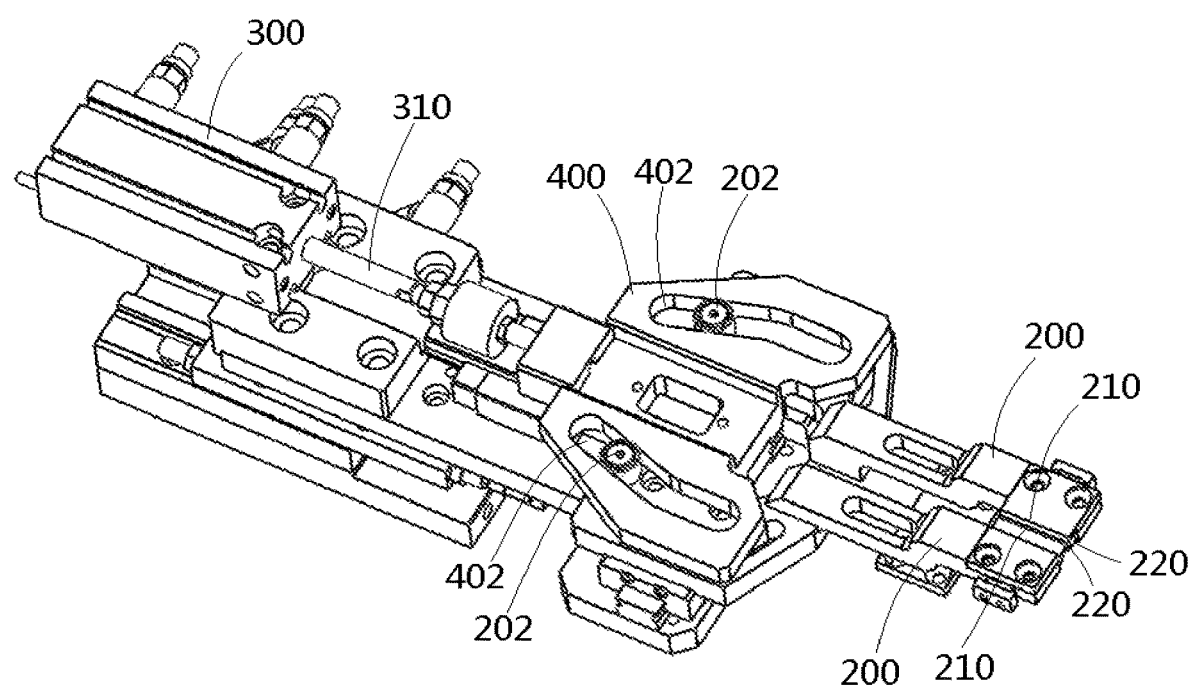
FIG. 3 is a bottom perspective view of the cutter with the pair of blades in a closed position.

As shown in FIGS. 1 to 3, in the illustrated embodiment, in the process of the pair of blade holders 200 moving synchronously in the direction of approaching each other, the pair of holding blocks 220 first clamp a linear element to be cut, such as a wire, and then the pair of blades 210 cut off the linear element that has been clamped by the pair of holding blocks 220.

As shown in FIGS. 1 to 3, in the illustrated embodiment, the pair of blade holders 200 are slidably installed on the support frame 100, so that the pair of blade holders 200 can slide in a first direction X. A sliding track 101 extending in the first direction X is provided on the support frame 100, and a slider 201 cooperating with the sliding track 101 is provided on each blade holder 200, so that the blade holder 200 can slide along the sliding track 101.

As shown in FIGS. 1 to 3, in the illustrated embodiment, the driving device (300, 400) comprises a cylinder 300 and a driving plate 400. The cylinder 300 is installed on the support frame 100, and a telescopic rod 310 of the cylinder 300 can extend forward or retract backward in a second direction Y perpendicular to the first direction X. The driving plate 400 is connected to the telescopic rod 310 of the cylinder 300, and can move forward or backward in the second direction Y along with the telescopic rod 310.

As shown in FIGS. 1 to 3, in the illustrated embodiment, each of the pair of blade holders 200 has a sliding pin 202. A pair of sliding grooves 402 respectively corresponding to the pair of sliding pins 202 are formed in the driving plate 400. The sliding pin 202 is slidably fitted in the sliding groove 402 and can slide along a path defined by the sliding groove 402.

As shown in FIGS. 1 to 3, in exemplary embodiments, when the cylinder 300 drives the driving plate 400 to move forward or backward, the pair of sliding pins 202 move in a direction of approaching each other or separating away from each other under the constraint and pushing of the pair of sliding grooves 402, thereby pushing the pair of blade holders 200 to slide along the sliding track 101 in the direction of approaching each other or separating away from each other. When the cylinder 300 drives the driving plate 400 to move forward, the pair of sliding pins 202 moves in a direction of approaching each other under the constraint and pushing of the pair of sliding grooves 402, thereby pushing the pair of blade holders 200 to slide along the sliding track 101 in the direction of approaching each other. When the cylinder 300 drives the driving plate 400 to move backward, the pair of sliding pins 202 moves in a direction of separating away from each other under the constraint and pushing of the pair of sliding grooves 402, thereby pushing the pair of blade holders 200 to slide along the sliding track 101 in a direction of separating away from each other.

As shown in FIGS. 1 to 3, in the illustrated embodiment, at least a part of the sliding groove 402 is inclined with respect to the second direction Y, so that a linear movement of the driving plate 400 in the second direction Y can be converted into a linear movement of the blade holder 200 in the first direction X.

As shown in FIGS. 1 to 3, in the illustrated embodiment, the blade holder 200 has a first surface and a second surface that are opposed to each other in a third direction Z perpendicular to the first direction X and the second direction Y. The slider 201 is provided on the first surface of the blade holder 200, and the sliding pin 202 is provided on the second surface of the blade holder 200.

As shown in FIGS. 1 to 3, in the illustrated embodiment, the blade holder 200 comprises a base 200a and an arm 200b extending forward from the base 200a. The slider 201 and the sliding pin 202 are provided on the base 200a of the blade holder 200, and the blade 210 and the holding block 220 are installed on the arm 200b of the blade holder 200. In the shown embodiment, the holding block 220 has elasticity, so that after the linear element is clamped by the pair of holding blocks 220, the pair of blade holders 200 can continue moving in the direction of approaching each other by compressing the holding block 220 until the linear element is cut off by the blade 210.

In an embodiment, a spring is provided between the holding block 220 and the blade holder 200, so that after the linear element is clamped by the pair of holding blocks 220, the pair of blade holders 200 can continue moving in the direction of approaching each other by compressing the spring until the linear element is cut off by the blade 210.

The cutter according to the disclosed embodiments can automatically complete the cutting of elongated elements with a very small diameter, which improves the cutting efficiency and quality of the elongated elements.

It will be understood by those skilled in the art that the above-described embodiments are exemplary and that modifications may be made by those skilled in the art, and that structures described in the various embodiments may be freely combined without conflict in structure or principle.

Although the present disclosure has been described in combination with the attached drawings, embodiments disclosed in the attached drawings are intended to provide an exemplary description of the embodiments of the present disclosure, and should not be construed as a limitation of the present disclosure.

Although some embodiments under the general concept of the present disclosure have been shown and described, it would be appreciated by those of ordinary skills in the art that changes may be made in these embodiments without departing from the principles and spirit of the general concept of the present disclosure, the scope of which is defined by the claims and their equivalents.

It should be noted that the word "comprise" or "comprising" does not exclude other elements or steps, and the word "a", "an" or "the" does not exclude plural of objects referred to. In addition, any reference signs in the claims should not be construed as limiting the scope of the present disclosure.

What is claimed is:
1. A cutter for cutting a linear element, comprising:
   a support frame;
   a pair of blade holders disposed opposite to each other and slidably disposed on the support frame, each of the blade holders has a first side and a second side facing opposite the first side;
   a pair of blades facing each other and each disposed on one of the pair of blade holders;
   a pair of holding blocks facing each other and each disposed on one of the pair of blade holders; and
   a driving device disposed on the support frame and including a driving plate for driving the pair of blade holders to move synchronously in a direction approaching each other or a direction separating away from each other, the pair of holding blocks clamp the linear element and the pair of blades cut off the linear element clamped by the pair of holding blocks while the pair of blade holders move synchronously in the direction approaching each other, the driving plate arranged on the first side of each of the blade holders and each blade holder slidably mounted to the support frame on the second side thereof opposite the first side.

2. The cutter of claim 1, wherein the support frame has a sliding track extending in a first direction.

3. The cutter of claim 2, wherein each blade holder of the pair of blade holders has a slider cooperating with the sliding track, each blade holder is slidable along the sliding track.

4. The cutter of claim 3, wherein the driving device includes a cylinder disposed on the support frame and having a rod extendable forward or retractable backward in a second direction perpendicular to the first direction.

5. The cutter of claim 4, wherein the driving plate is connected to the rod of the cylinder, the driving plate is movable forward or backward in the second direction along with the rod.

6. The cutter of claim 5, wherein each of the pair of blade holders has a sliding pin, a pair of sliding grooves each corresponding to the sliding pin of one of the pair of blade holders are formed in the driving plate, the sliding pin is slidably fitted in one of the sliding grooves and is slidable along a path defined by the one of the sliding grooves.

7. The cutter of claim 6, wherein the pair of sliding pins move in a direction approaching each other or a direction separating away from each other under the constraint and pushing of the pair of sliding grooves in response to the cylinder driving the driving plate to move forward or backward.

8. The cutter of claim 7, wherein the sliding pins push the pair of blade holders to slide along the sliding track in the direction approaching each other or the direction separating away from each other.

9. The cutter of claim 8, wherein the pair of sliding pins move in the direction approaching each other under the constraint and pushing of the pair of sliding grooves in response to the cylinder driving the driving plate to move forward, pushing the pair of blade holders to slide along the sliding track in the direction approaching each other.

10. The cutter of claim 9, wherein the pair of sliding pins move in the direction separating away from each other under the constraint and pushing of the pair of sliding grooves in response to the cylinder driving the driving plate to move backward, pushing the pair of blade holders to slide along the sliding track in the direction separating away from each other.

11. The cutter of claim 10, wherein at least a part of each of the sliding grooves is inclined with respect to the second direction, a linear movement of the driving plate in the second direction is converted into a linear movement of the blade holder in the first direction.

12. The cutter of claim 8, wherein the first side and the second side of the blade holders face opposite to each other in a third direction perpendicular to the first direction and the second direction, the slider is disposed on the first side of the blade holder and the sliding pin is disposed on the second side of the blade holder.

13. The cutter of claim 12, wherein each of the blade holders has a base and an arm extending forward from the base, the slider and the sliding pin are disposed on the base and one of the blades and one of the holding blocks are disposed on the arm.

14. The cutter of claim 8, wherein the pair of sliding pins move in the direction approaching each other under the constraint and pushing of the pair of sliding grooves in response to the cylinder driving the driving plate, pushing the pair of blade holders to slide along the sliding track in the direction approaching each other.

15. The cutter of claim 1, wherein the pair of holding blocks are formed from a compressible material, the pair of blade holders continue moving in the direction approaching each other after the linear element is clamped by the pair of holding blocks, the holding blocks are compressed until the linear element is cut off by the blades.

16. The cutter of claim 1, further comprising a spring disposed between each of the holding blocks and the blade holder of the pair of blade holders on which the holding block is disposed, the pair of blade holders continue moving in the direction approaching each other by compressing the spring after the linear element is clamped by the pair of holding blocks until the linear element is cut off by the blades.

17. A cutter for cutting a linear element, comprising:
a support frame;
a pair of blade holders disposed opposite to each other and slidably disposed on the support frame;
a pair of blades facing each other and each disposed on one of the pair of blade holders;
a pair of holding blocks facing each other and each disposed on one of the pair of blade holders; and
a driving device including an actuator and a driving guide fixed to a movable end of the actuator for moving the driving guide along a first linear axis, the driving device disposed on the support frame and driving a first one of the blade holders along a second linear axis perpendicular to the first linear axis in a direction approaching a second one of the blade holders or away from the second blade holder, the pair of holding blocks clamp the linear element and the pair of blades cut off the linear element clamped by the pair of holding blocks.

18. The cutter of claim 17, wherein the holding blocks clamp the linear element independently of the blades.

19. The cutter of claim 17, further comprising a guide follower connected to the first blade holder and slidably engaged within a sliding slot formed through the driving guide, the sliding slot oriented obliquely relative to the first linear axis and having a first end arranged proximate the first linear axis and a second end arranged distal to the first linear axis in a direction parallel to the second linear axis, the first blade holder moved along the second axis under the constraint and bias of the sliding slot, a first blade of the pair of blades disposed on the first blade holder converges toward a second blade of the pair of blades along the second axis as the guide follower is moved from the second end of the sliding slot toward the first end of the sliding slot.

20. The cutter of claim 17, wherein the first blade holder has a first surface and a second surface that face opposite each other, the driving plate arranged on the first side of the first blade holder and the first blade holder slidably mounted to the support frame on the second side thereof opposite the first side.

* * * * *